B. VERLANGIERI.
WINDSHIELD CLEARER.
APPLICATION FILED APR. 19, 1921.

1,407,605.

Patented Feb. 21, 1922.

WITNESSES

INVENTOR
BASIL VERLANGIERI

BY

ATTORNEYS

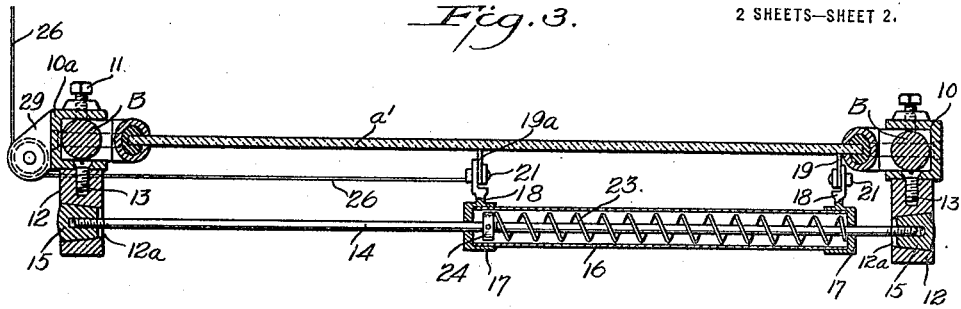
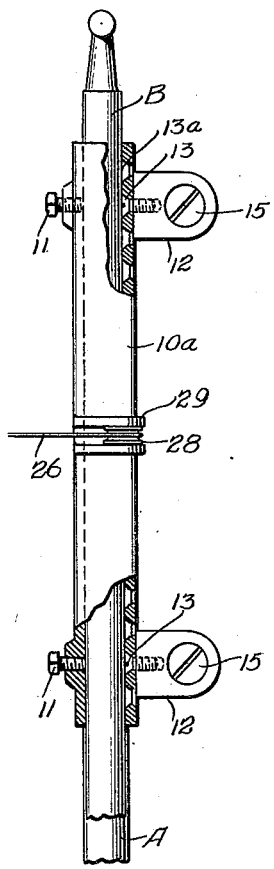
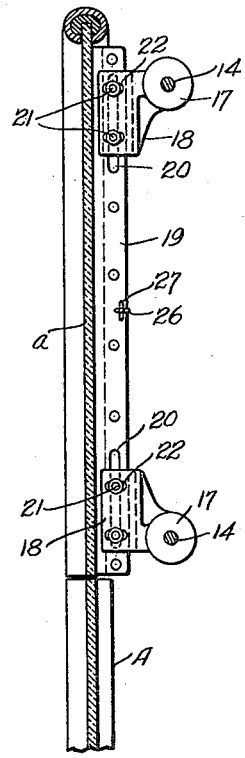
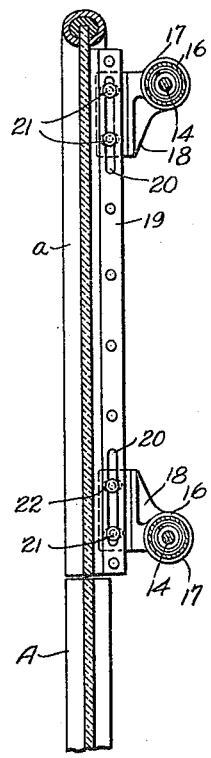

UNITED STATES PATENT OFFICE.

BASIL VERLANGIERI, OF NEW YORK, N. Y.

WINDSHIELD CLEARER.

1,407,605.  Specification of Letters Patent.  Patented Feb. 21, 1922.

Application filed April 19, 1921. Serial No. 462,485.

*To all whom it may concern:*

Be it known that I, BASIL VERLANGIERI, a citizen of the United States, and a resident of the city of New York, borough of the Bronx, in the county of Bronx and State of New York, have invented a new and Improved Windshield Clearer, of which the following is a description.

My invention relates to a device adapted to be mounted on a windshield and optionally operable for clearing the windshield of snow or moisture.

The general object of my invention is to provide a device for the indicated purpose that may be readily mounted in position and conveniently operated.

A more specific object of the invention is to provide a device of the indicated character and adapted to be readily taken apart or assembled.

Reference is to be had to the accompanying drawings forming a part of this specification, it being understood that the drawings are merely illustrative of one example of the invention.

Figure 3 is a horizontal section on the line 3—3, Figure 1;

Figure 4 is an end view of the attachment, parts being broken away and in section;

Figure 5 is a transverse vertical section on the line 5—5, Figure 2;

Figure 6 is a transverse vertical section on the line 6—6, Figure 2.

Figure 1:
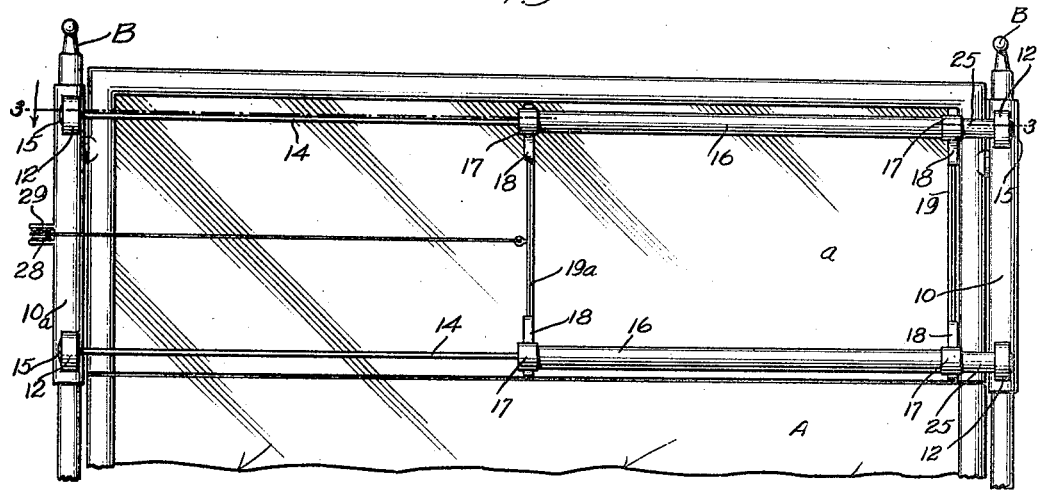
Figure 1 is a front view of a windshield clearer illustrating the same on a windshield shown in part.
Figure 2:
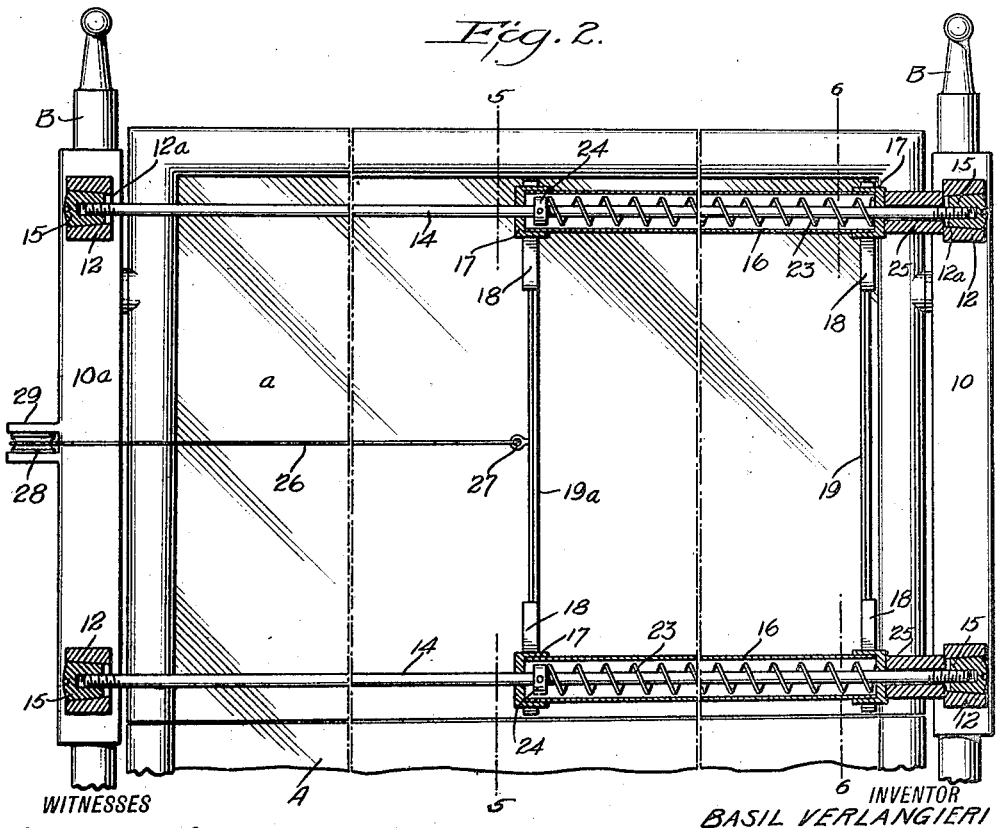
Figure 2 is a partly sectional elevation on a larger scale.

In carrying out my invention in accordance with the illustrated example, I provide a pair of clamps 10 adapted to be secured in position at the ends of the windshield, said clamps being here shown as U-shaped in horizontal section to be slipped laterally over the standards B of the windshield. The clamps 10, 10$^a$ have set screws 11 for securing them in position. Projecting from the front of each clamp 10, 10$^a$ are upper and lower brackets 12 which may be secured as shown to the clamps by screws 13.

Opposite brackets 12 on the respective clamps 10, 10$^a$ support the ends of upper and lower horizontal guide rods 14. Said rods are threaded at the ends and receive tapered nuts 15 which are accommodated in transverse holes 12$^a$ in the brackets 12. On the rods 14 are slidably mounted cylinders 16 and formed on or secured to the end cap 17 of said cylinders are brackets 18. Each pair of brackets 18 at one end of the cylinders 16 carries a squeegee or other wiping element 19, 19$^a$ secured to the bracket by a slot and pin connection, said wiper having vertical slots 20 through which transverse pins 21 pass and into the brackets 18. Additional transverse slots 22 in the brackets 18 permit both a vertical and a lateral adjustment of the bracket to position the wiping element close to the windshield. The wipers 19, 19$^a$ are of a height only to clear the upper section $a$ of the windshield A.

Within the cylinders 16, springs 23 are coiled about the rods 14, said springs bearing at one end against collars 24 on said rods and bearing at the opposite ends against the cylinders at one end thereof tending to maintain the cylinders adjacent to one end of the windshield. Bumpers 25 may be provided on the rods 14 between the cylinders 16 and the brackets 12 to cushion the cylinders when restored by the springs 23.

In order to move the wipers over the windshield in opposition to the spring 23 a cord or wire 26 is secured to an eye 27 or the like on one wiper 19$^a$. The wipers 19, 19$^a$ are spaced so that one is adjacent to the end of the windshield while the other is at the approximate center so that each wiper will clear one-half of the windshield section. The cord 26 passes over the sheave 28 turning in brackets 29 on one clamp 10$^a$, said cord in practice extending to a point adjacent to the driver's seat.

With the described arrangement a pull on the cord 26 will impart a wiping movement to the wipers 19, 19$^a$ and the spring 23 will restore the wipers and cylinders 16 after a pull by the cord 26.

I would state in conclusion that while the illustrated example constitutes a practical embodiment of my invention, I do not limit myself strictly to the exact details herein illustrated, since manifestly the same can be considerably varied without departure from the spirit of the invention as defined in the appended claims.

Having thus described my invention, I claim:

1. A windshield clearer comprising clamps for mounting the clearer in position on a windshield, a pair of brackets on each clamp, transverse guide rods supported at their ends in said brackets and having threaded ends, tapered nuts fitting the threaded ends of said rods and accommodated in transverse holes in said brackets, a pair of wipers disposed vertically between said guide rods, and means carrying said wipers and slidable on said guide rods.

2. A windshield clearer including clamps for mounting said clearer in position on a windshield, upper and lower transverse guide rods, detachably secured to said clamps, cylinders slidable on said guide rods, coil springs on the guide rods within the cylinders, collars on the guide rods against which the springs abut at one end, wipers carried by said cylinders, said wipers being placed approximately half the length of a windshield, and manually operable means connected with one of said wipers to move the same in one direction, said springs tending to restore the cylinders and wipers after an operation by said means.

BASIL VERLANGIERI.